(12) United States Patent
Pangeni et al.

(10) Patent No.: US 11,329,905 B1
(45) Date of Patent: May 10, 2022

(54) DISTRIBUTED ADAPTIVE PROBABILITY FOR POPULATION SELECTION OF REMOTE DEVICES IN A NETWORK

(71) Applicant: Zscaler, Inc., San Jose, CA (US)

(72) Inventors: Sushil Pangeni, Fremont, CA (US); Srikanth Devarajan, Cupertino, CA (US); Ajit Singh, Fremont, CA (US); Sandeep Kamath, Sunnyvale, CA (US); Chenglong Zheng, Fremont, CA (US); Chakkaravarthy Periyasamy Balaiah, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 17/406,562

(22) Filed: Aug. 19, 2021

(51) Int. Cl.
| | |
|---|---|
| *H04L 43/065* | (2022.01) |
| *H04L 41/0893* | (2022.01) |
| *H04L 41/14* | (2022.01) |
| *H04L 41/12* | (2022.01) |
| *H04L 43/08* | (2022.01) |

(52) U.S. Cl.
CPC ........ *H04L 43/065* (2013.01); *H04L 41/0893* (2013.01); *H04L 41/12* (2013.01); *H04L 41/14* (2013.01); *H04L 43/08* (2013.01)

(58) Field of Classification Search
CPC ..... H04L 41/0893; H04L 41/12; H04L 41/14; H04L 63/065; H04L 63/08
See application file for complete search history.

(56) References Cited

U.S. PATENT DOCUMENTS

| | | |
|---|---|---|
| 7,926,116 B2 | 4/2011 | Kamath et al. |
| 8,010,085 B2 | 8/2011 | Apte et al. |
| 8,116,207 B2 | 2/2012 | Schekochikhin et al. |
| 8,185,510 B2 | 5/2012 | Chaudhry et al. |
| 8,230,054 B2 | 7/2012 | Mutnuru et al. |
| 8,230,055 B2 | 7/2012 | Kondamuru et al. |
| 8,259,571 B1 | 9/2012 | Raphel et al. |
| 8,275,871 B2 | 9/2012 | Ram et al. |
| 8,335,943 B2 | 12/2012 | Kamath et al. |
| 8,429,111 B1 | 4/2013 | Kailash et al. |
| 8,458,786 B1 | 6/2013 | Kailash et al. |
| 8,464,335 B1 | 6/2013 | Sinha et al. |
| 8,763,071 B2 | 6/2014 | Sinha et al. |
| 8,812,904 B2 | 8/2014 | Kamath et al. |
| 8,825,859 B2 | 9/2014 | Mutnuru et al. |
| 8,832,260 B2 | 9/2014 | Raja et al. |
| 8,838,630 B2 | 9/2014 | Bots et al. |

(Continued)

FOREIGN PATENT DOCUMENTS

| | | | |
|---|---|---|---|
| EP | 2 517 406 B1 | 6/2015 | |
| EP | 2 070 296 B1 | 10/2015 | |
| WO | WO-2021123045 A1 * | 6/2021 | ............. G16H 50/00 |

*Primary Examiner* — Gil H. Lee
(74) *Attorney, Agent, or Firm* — Clements Bernard Baratta; Lawrence A. Baratta, Jr.

(57) ABSTRACT

Systems and methods include connecting to and authenticating a set of user devices of a plurality of user devices; determining an election of a subset of user devices of the set of user devices, wherein the election determines which user devices perform metric collection; providing any of policy and configuration to the plurality of user devices including election information; and receiving metrics based on measurements at the subset of user devices of user devices according to corresponding policy and configuration.

16 Claims, 16 Drawing Sheets

(56) References Cited

U.S. PATENT DOCUMENTS

| | | |
|---|---|---|
| 8,887,249 B1 | 11/2014 | Schekochikhin et al. |
| 8,955,091 B2 | 2/2015 | Kailash et al. |
| 9,065,800 B2 | 6/2015 | Devarajan et al. |
| 9,185,019 B2 | 11/2015 | Kamath et al. |
| 9,426,220 B2 | 8/2016 | Chauhan et al. |
| 9,471,469 B2 | 10/2016 | Mishra et al. |
| 9,473,537 B2 | 10/2016 | Sinha et al. |
| 9,519,518 B2 | 12/2016 | Kamath et al. |
| 9,531,758 B2 | 12/2016 | Devarajan et al. |
| 9,569,195 B2 | 2/2017 | Schekochikhin et al. |
| 9,596,299 B2 | 3/2017 | Yengalasetti et al. |
| 9,596,305 B2 | 3/2017 | Chauhan et al. |
| 9,619,542 B2 | 4/2017 | Kamath et al. |
| 9,621,666 B2 | 4/2017 | Bots et al. |
| 9,621,668 B2 | 4/2017 | Kamath et al. |
| 9,760,283 B2 | 9/2017 | Kalipatnapu et al. |
| 9,781,196 B2 | 10/2017 | Suganthi et al. |
| 9,866,463 B2 | 1/2018 | Raja et al. |
| 9,888,068 B2 | 2/2018 | Kamath et al. |
| 9,912,638 B2 | 3/2018 | Kailash et al. |
| 9,935,955 B2 | 4/2018 | Desai et al. |
| 10,007,699 B2 | 6/2018 | Pangeni et al. |
| 10,216,790 B2 | 2/2019 | Kailash et al. |
| 10,432,651 B2 | 10/2019 | Pangeni et al. |
| 10,728,117 B1 | 7/2020 | Sharma et al. |
| 10,749,907 B2 | 8/2020 | Sinha et al. |
| 10,824,409 B2 | 11/2020 | Arumugam et al. |
| 10,846,136 B2 | 11/2020 | Muthiah et al. |
| 10,880,377 B2 | 12/2020 | Ghatak et al. |
| 10,892,964 B2 | 1/2021 | Sharma et al. |
| 10,938,686 B2 | 3/2021 | Sharma et al. |
| 2020/0259792 A1 | 8/2020 | Devarajan et al. |
| 2020/0259793 A1 | 8/2020 | Pangeni et al. |
| 2021/0119798 A1 | 4/2021 | Bayar et al. |
| 2021/0272703 A1* | 9/2021 | Wang ................ G06N 5/04 |

* cited by examiner

US 11,329,905 B1

DISTRIBUTED ADAPTIVE PROBABILITY FOR POPULATION SELECTION OF REMOTE DEVICES IN A NETWORK

FIELD OF THE DISCLOSURE

The present disclosure relates generally to networking and computing. More particularly, the present disclosure relates to a highly scalable Representational State Transfer (REST) RESTful framework, to a distributed Telemetry and Policy Gateway (TPG) using the RESTful framework for policy, configuration, and metric publication, to an election mechanism for randomly selecting devices for metric measurement, and to geo tagging of the metrics.

BACKGROUND OF THE DISCLOSURE

Representational State Transfer (REST) is a software architectural style which uses a subset of Hypertext Transfer Protocol (HTTP). It is commonly used to create interactive applications that use Web services. A Web service that follows these guidelines is called RESTful. Such a Web service must provide its Web resources in a textual representation and allow them to be read and modified with a stateless protocol and a predefined set of operations. This approach allows interoperability between the computer systems on the Internet that provide these services. As services grow, there is a need to scale in terms of infrastructure, developing and testing new software modules, parallel development, etc.

A service may be implemented via microservices or as a monolith. A monolith software system introduces productivity challenges as complexity increases, relative to microservices. However, there are situations where the monolith software system is advantageous over microservices. For example, a user monitoring system that deals with packet processing can be a monolith system that is highly optimized for hardware efficiency and latency can be lowered by reducing latency of inter module communication. For example, imagine if a firewall module and a proxy module were microservices, additional latency between them would degrade user experience.

Comparing microservices versus a monolith, for less complex systems, the extra baggage required to manage microservices reduces productivity. As complexity increases, microservices provide more productivity versus a monolith. Thus, growth brings challenges with a monolithic software system. For example, as new modules are added, so too does the coupling between the modules. Not all modules require the strict optimizations as core data path modules. As teams and team sizes increase, it introduces challenges in cross team communication and agreement decreasing feature velocity. The question becomes how to achieve higher modularity for new requirements while still maintaining high level of optimization in a software system.

BRIEF SUMMARY OF THE DISCLOSURE

The present disclosure relates to a highly scalable Representational State Transfer (REST) RESTful framework, to a distributed Telemetry and Policy Gateway (TPG) using the RESTful framework for policy, configuration, and metric publication, to an election mechanism for randomly selecting devices for metric measurement, and to geo tagging of the metrics. The present disclosure provides a modular communication approach that can be used between software modules in monolith software system. The present disclosure uses HTTP for communication between modules/services, moving towards a RESTful framework for transferring state and data between modules/services. The goal is not to decompose the whole monolith but instead help achieve higher modularity for new requirements and rewrites that are not so time sensitive by creating microservices.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

DETAILED DESCRIPTION OF THE DISCLOSURE

Again, the present disclosure relates to a highly scalable Representational State Transfer (REST) RESTful framework, to a distributed Telemetry and Policy Gateway (TPG) using the RESTful framework for policy, configuration, and metric publication, to an election mechanism for randomly selecting devices for metric measurement, and to geo tagging of the metrics The present disclosure provides a modular communication approach that can be used between software modules in monolith software system. The present disclosure uses HTTP for communication between modules/services, moving towards a RESTful framework for transferring state and data between modules/services. The goal is not to decompose the whole monolith but instead help achieve higher modularity for new requirements and rewrites that are not so time sensitive by creating microservices.

¶1.0 EXAMPLE CLOUD-BASED SYSTEM ARCHITECTURE

Figure 1:
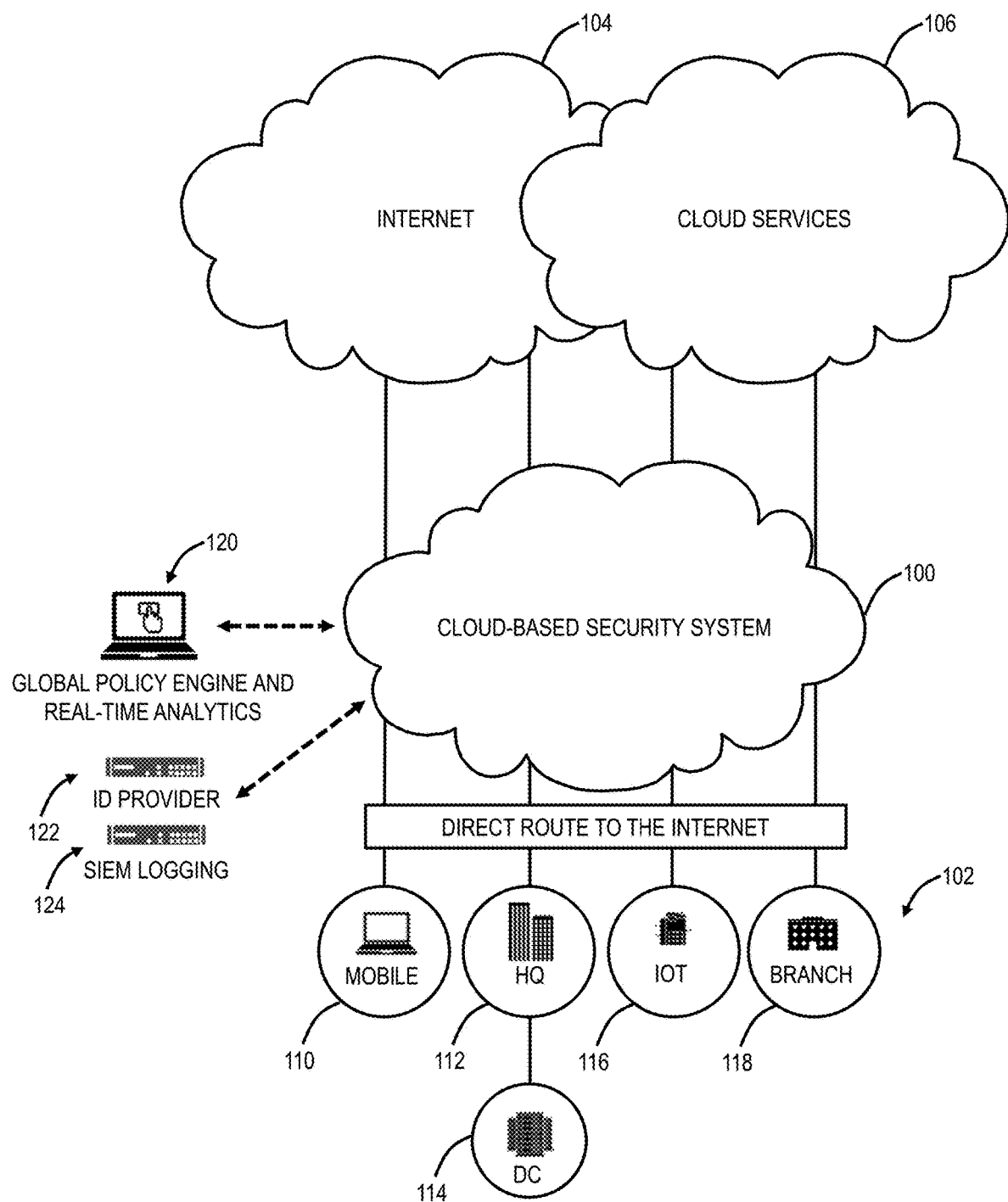
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
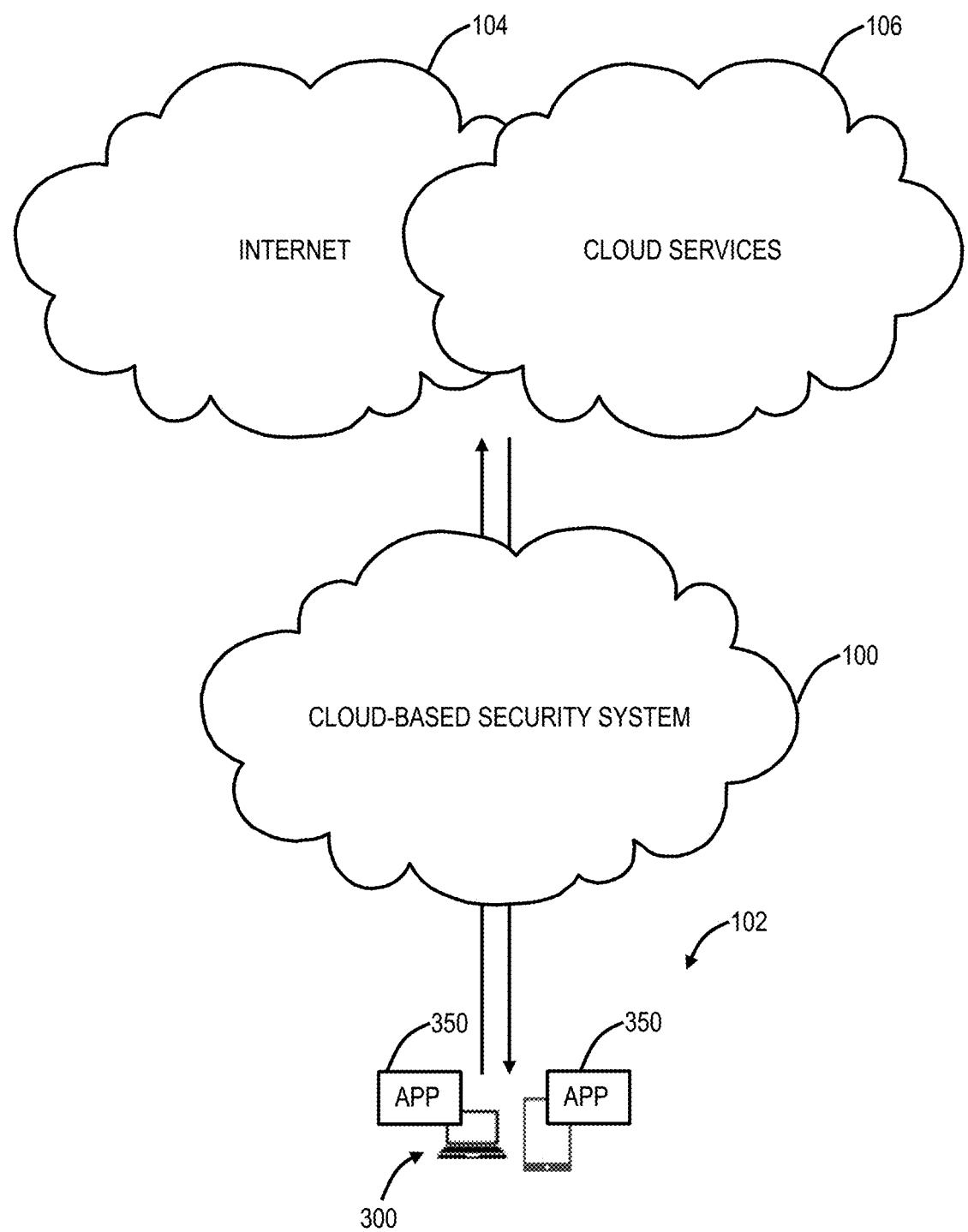
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc.

The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
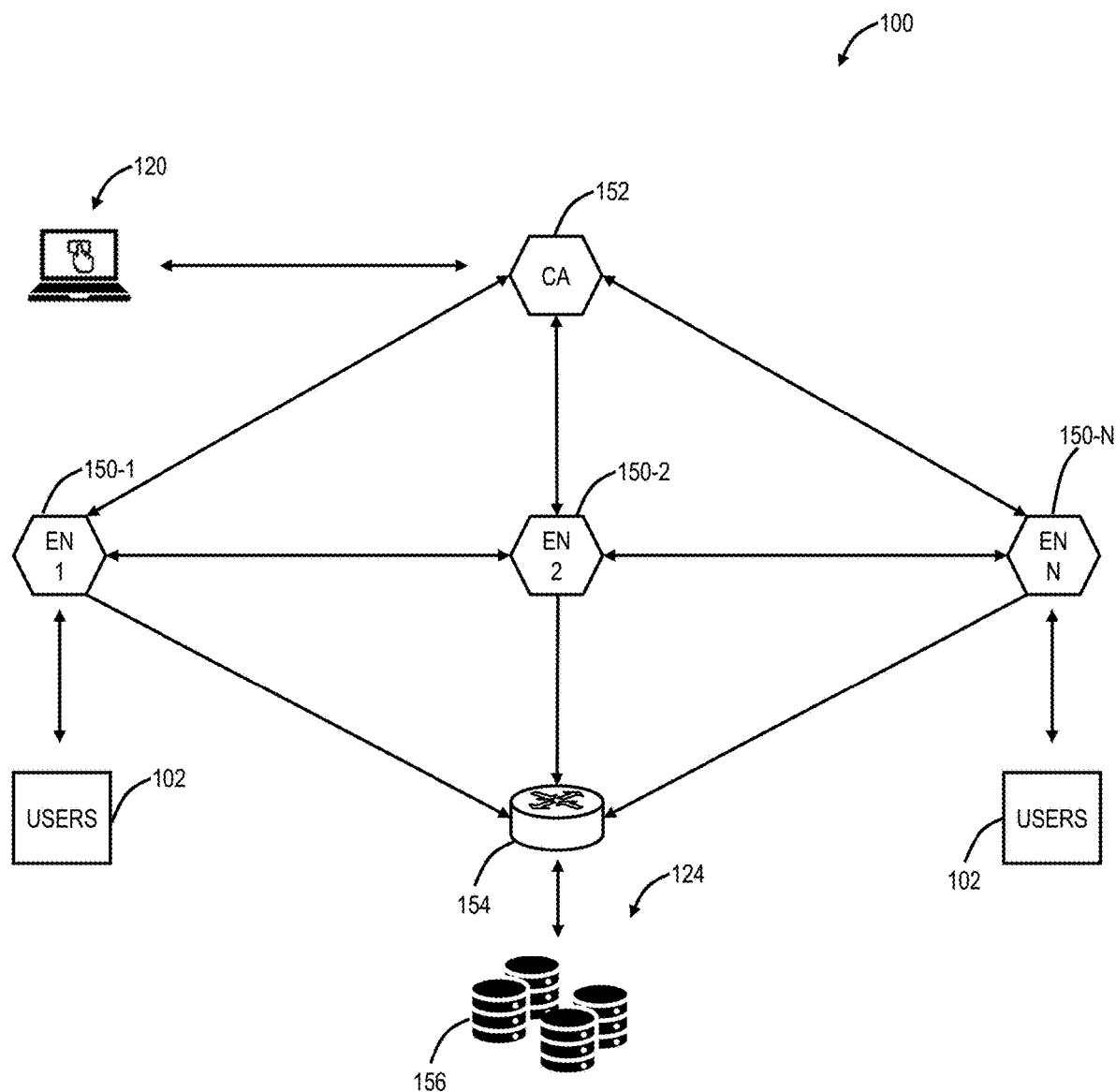
FIG. 2 is a network diagram of an example implementation of the cloud-based system.
Figure 4:
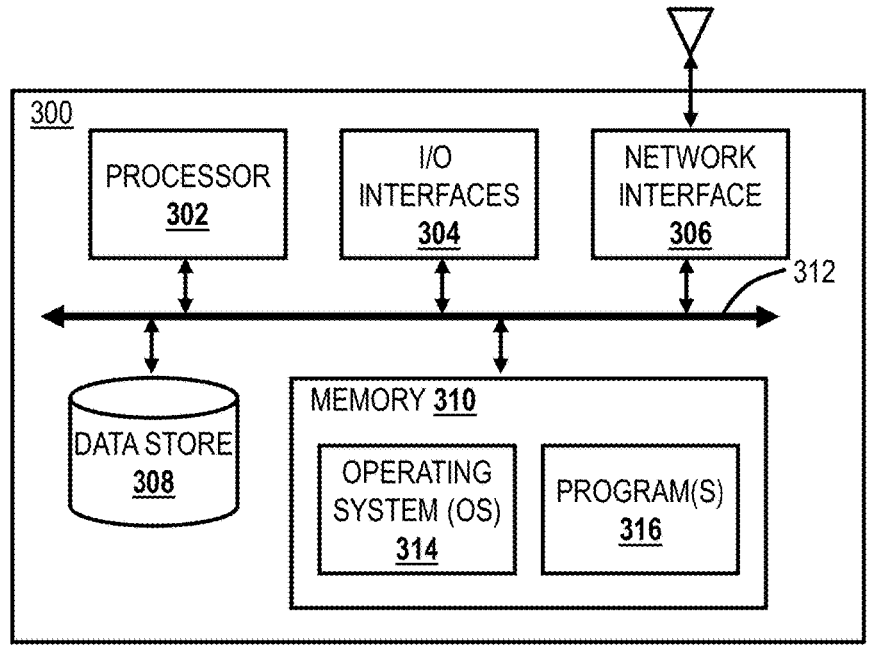

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security, i.e., proxies. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

¶2.0 EXAMPLE SERVER ARCHITECTURE

Figure 3:
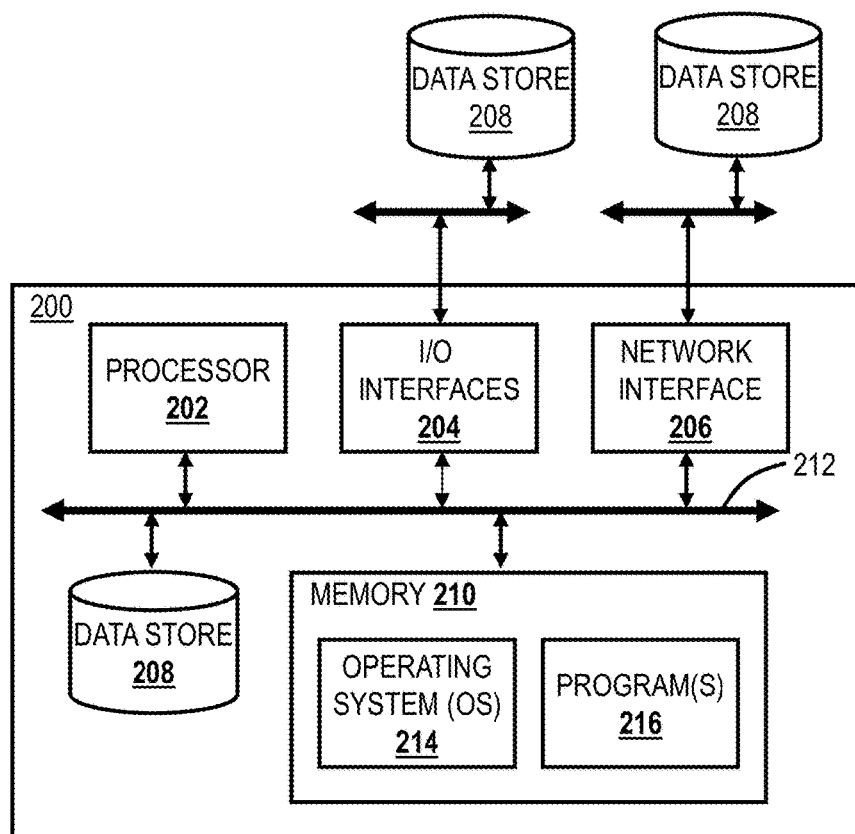

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

¶3.0 EXAMPLE USER DEVICE ARCHITECTURE

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The present disclosure relates to mobile devices, which are one subset of the user device 300. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

¶4.0 USER DEVICE APPLICATION FOR TRAFFIC FORWARDING AND MONITORING

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

¶5.0 ZERO TRUST NETWORK ACCESS USING THE CLOUD-BASED SYSTEM

Figure 6:
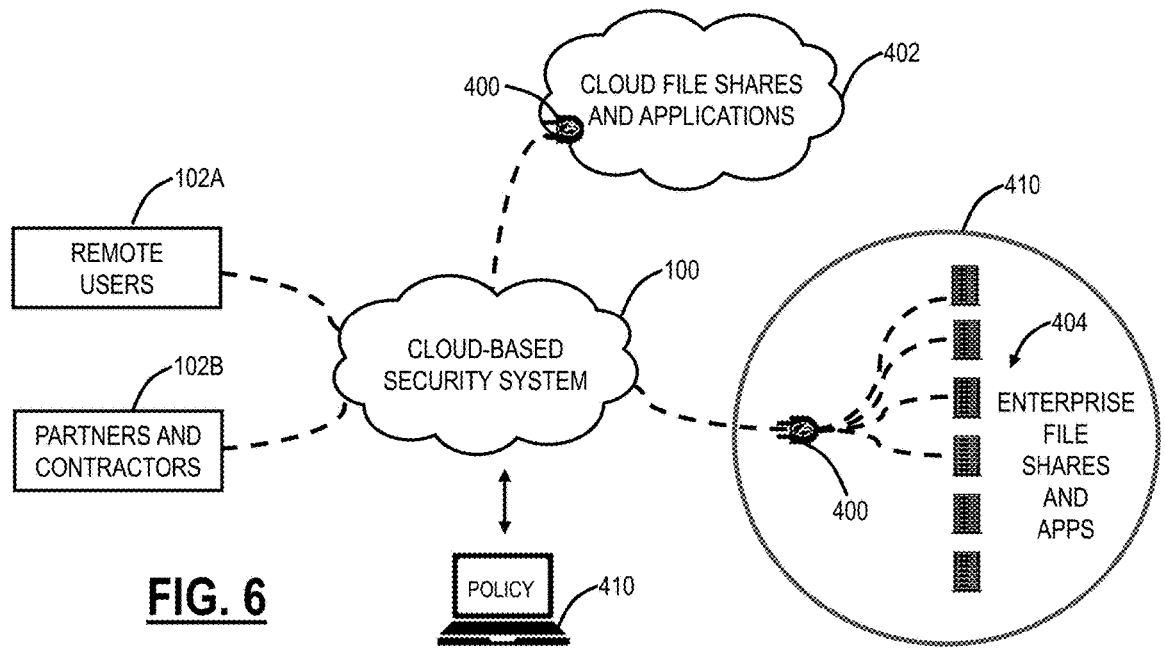
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 420 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy 410, and the cloud-based system 100 to stitch the applications 402, 404 and the software connectors 400 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. 5 can include the ZPA service from Zscaler, Inc.

¶6.0 DIGITAL EXPERIENCE MONITORING

Figure 7:
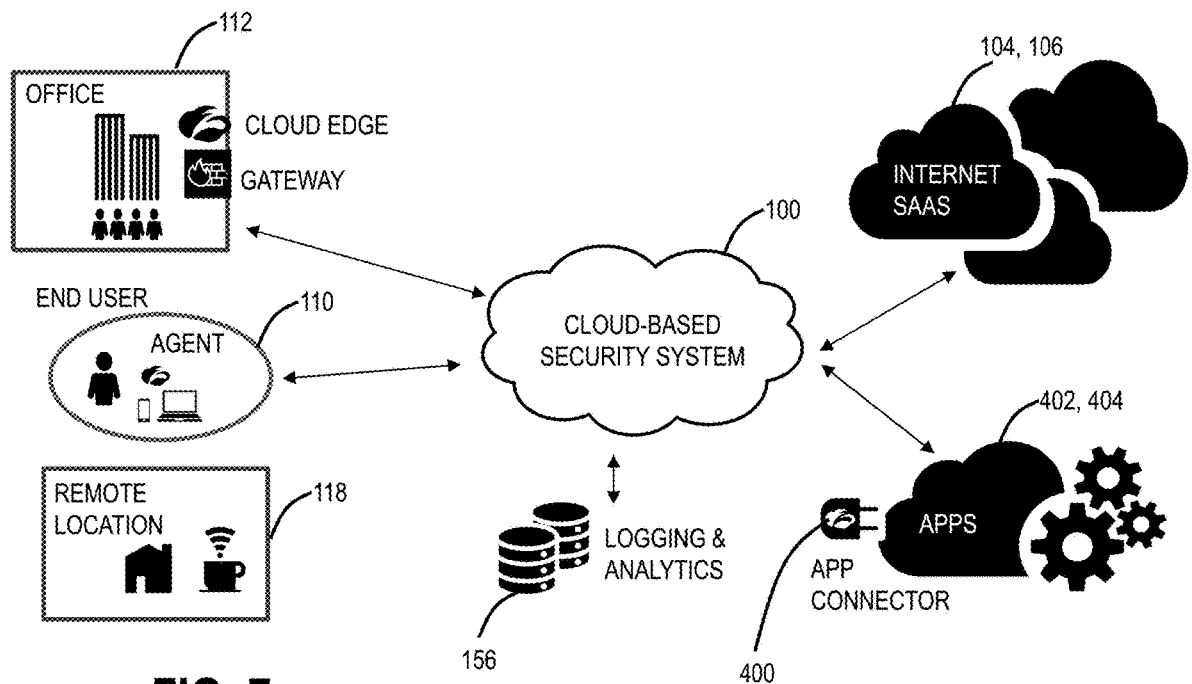
FIG. 7 is a network diagram of the cloud-based system in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
| --- | --- |
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| Network-related data | |
| --- | --- |
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
| --- | --- |
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

¶7.0 RESTFUL FRAMEWORK

The present disclosure includes a RESTful framework that is a library for creating a RESTful server, such as in the cloud-based system 100. The library provides Application Programming Interfaces (APIs) for app configuration, request handling, and logging. The present disclosure includes an approach using HTTP for communication between modules or services, moving towards a RESTful framework for transferring state and data. That is, the goal is not to decompose a whole monolith but instead help achieve higher modularity for new requirements and rewrites that are not so time sensitive by creating microservices, i.e., a hybrid between a monolith and microservices where the monolith is designed for time sensitive operations while microservices are used for non-time sensitive operations. The RESTful framework describes support for microservices and applications with a monolith.

Figure 8:
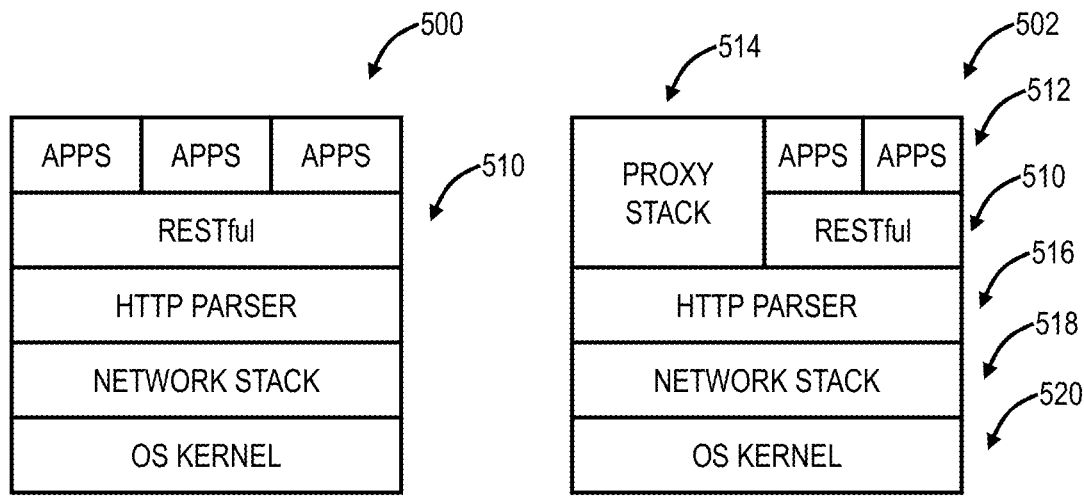
FIG. 8 is a diagram of stacks illustrating where a RESTful framework of the present disclosure operates.

FIG. 8 is a diagram of stacks 500, 502 illustrating where a RESTful framework 510 of the present disclosure operates. Specifically, the stack 500 illustrates all applications 512 on top of the RESTful framework 510. In the present disclosure, the stack 502 includes a proxy stack 514 which can be viewed as the monolith. For example, the proxy stack 514 can perform some or all of the functions described herein with respect to the enforcement node 150. In addition to the proxy stack 514, the stack 502 includes the applications 512 on top of the RESTful framework 510, and both the applications 512 and the proxy stack 514 utilize an HTTP parser 516, but the proxy stack 514 is direct without the RESTful framework 510. The HTTP parser 516 is on top of a network stack 518 which is top of an operating system kernel 520.

Figure 9:
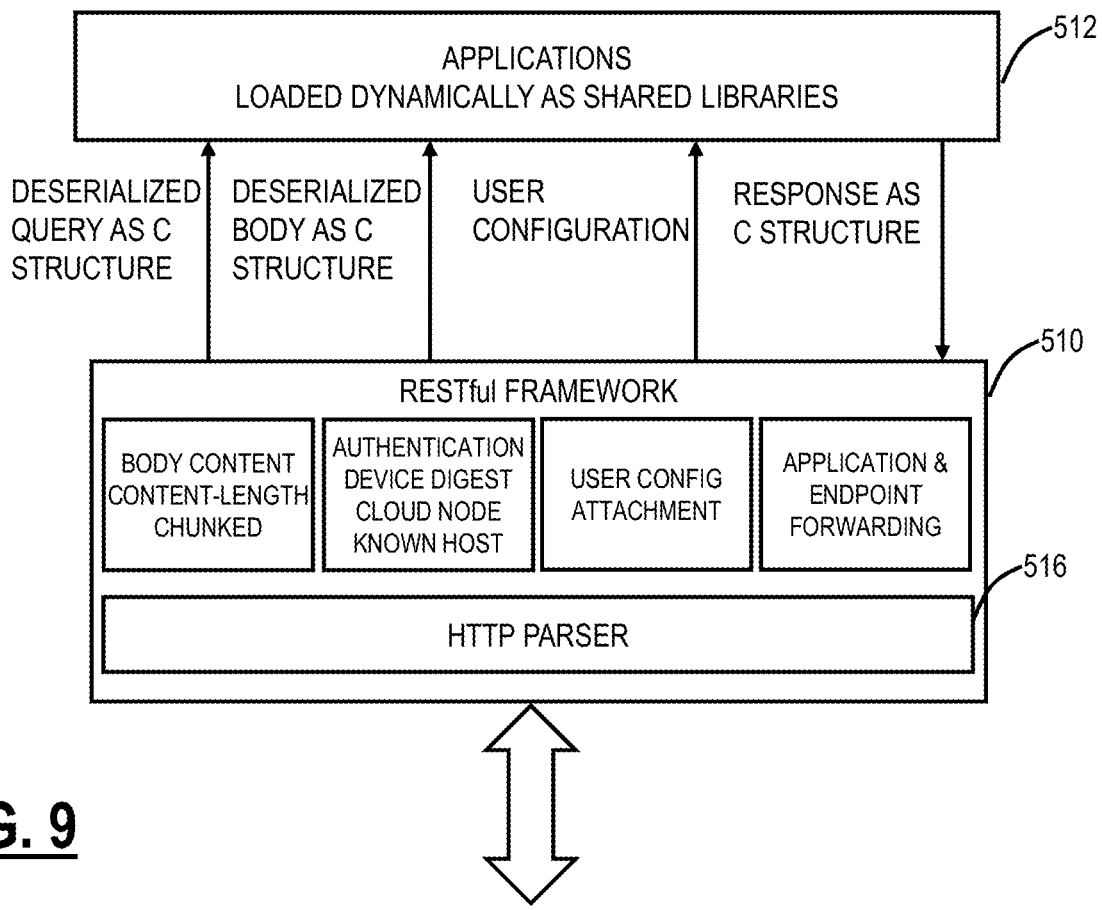
FIG. 9 is a diagram illustrating functionality of the RESTful framework.

FIG. 9 is a diagram illustrating functionality of the RESTful framework 510. The RESTful framework 510 interacts with the applications 512, that can be loaded dynamically as shared libraries, via deserialized queries and bodies with a C structure, for user configuration, and responses as a C structure, or any other language. The RESTful framework 510 can support multiple applications 512 on the same server 200, and uses path to redirect requests to corresponding applications 512. The RESTful framework 510 supports the following HTTP methods, GET, POST, PUT and DELETE, and the applications 512 can choose to run as HTTPS only, HTTP only or Both. A POST request using content length is supported. Chunk encoding is supported, a client needs to specify it in the request header. The RESTful framework 510 supports decoding gzip-encoded payload, an encoding response payload. The RESTful framework 510 supports deserializing of input JSON to C structures and serialization of C structures to JSON output.

The RESTful framework 510 supports IP whitelist Based Authentication where the application 512 can specify the list of IP addresses to allow access to the application endpoints.

In an embodiment, the RESTful framework 510 can be used for the applications 512 to upload metrics periodically to a central hub.

¶7.1 RESTFUL FRAMEWORK MODES

The RESTful framework 510 can be deployed in two modes. One is a standalone mode and the other is embedded mode. In standalone mode the instance or binary runs the RESTful stack 500 as the primary stack whereas in embedded mode the stack 502 has to co-exists with other stacks like the proxy stack 502. In the embedded mode, the RESTful framework 510 can be run along with the functions described herein for the enforcement node 150 as an embedded service. The RESTful framework 510 has a port enabled for listening to HTTP or HTTPS data.

Each application 512 implements its own input/output controls (IOCTLs) just like HTTP endpoints. The application 512 can define IOCTLs and put the config in the config.json file. Application specific IOCTLs can be sent using HTTP as well.

¶7.2 SNI BASED ROUTING

Figure 10:
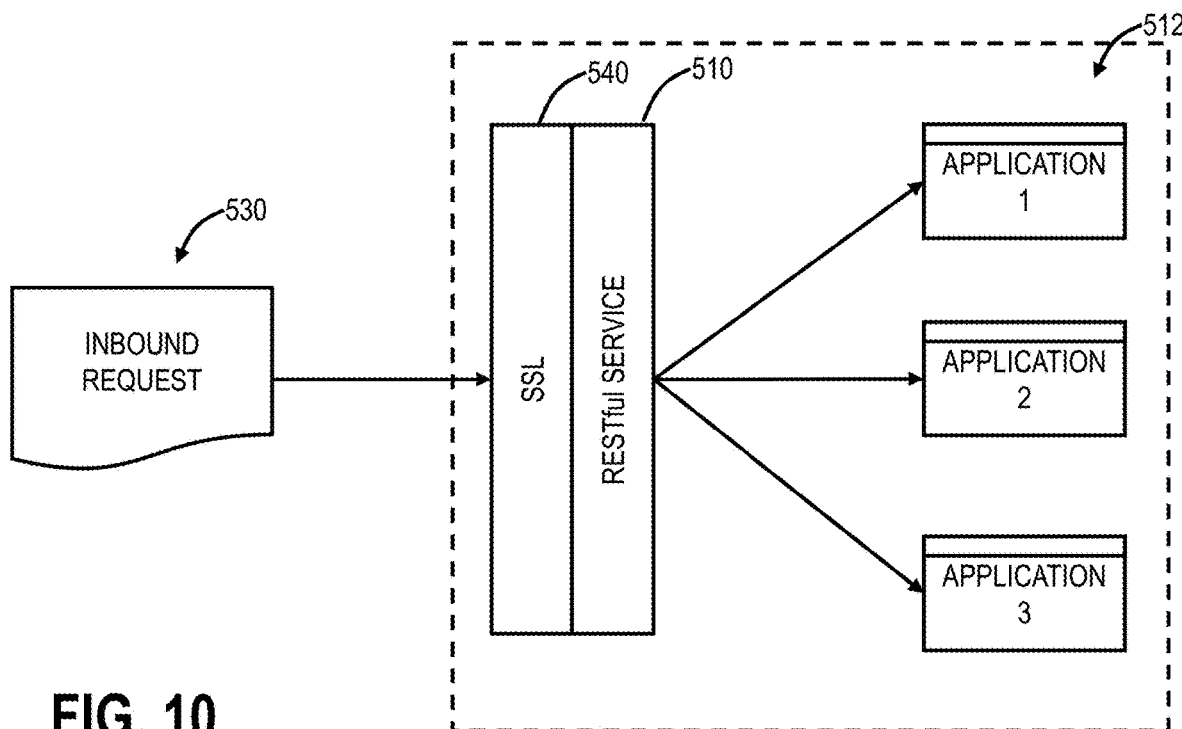
FIG. 10 is a diagram of Server Name Indication (SNI)-based routing with the RESTful framework.

FIG. 10 is a diagram of Server Name Indication (SNI)-based routing with the RESTful framework 510. Here, an inbound request 530, such as through the cloud-based system 100 and via a tunnel 540, can be routed by the RESTful framework 510 to the appropriate application 512 using SNI. This allows new applications 512 to be seamlessly integrated into existing services in the cloud-based system 100. There are no requirements for opening new ports and traffic is routed to appropriate applications 512 during SSL handshake based on the domain name.

¶7.3 LOAD BALANCING

Figure 11:
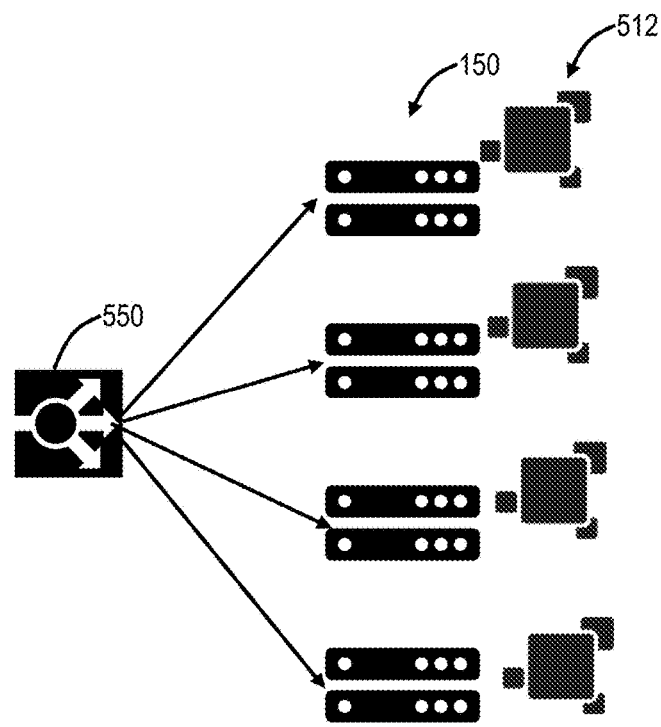
FIG. 11 is a diagram of load balancing multiple nodes implementing the RESTful framework with a load balancer.

FIG. 11 is a diagram of load balancing multiple nodes 150 implementing the RESTful framework 510 with a load balancer 550. The load balancer 550 can be part of the cloud-based system 100 and the RESTful framework 510 can be implemented on the enforcement nodes 150 in the cloud-based system 100.

The load balancer 550 can monitor the applications 512 and the RESTful framework 510 on the nodes 150 using Internet Control Message Protocol (ICMP), HTTP, or the like. In an embodiment, HTTP is utilized to directly monitor the applications 512 for load balancing.

¶7.4 APPLICATIONS IN THE RESTFUL FRAMEWORK

The RESTful framework 510 is developed similar to the microservices concept where each application 512 is treated as a single service and APIs are defined. The applications 512 uses an HTTP connection in the RESTful framework 510, but the applications 512 can be configured to switch to different protocols. Each endpoint defined in config.json must be handled by a callback method. A query and JSON request body must have corresponding deserializer. The JSON response body must have corresponding serializer.

¶7.5 METRIC COLLECTION USING THE RESTFUL FRAMEWORK

Figure 12:
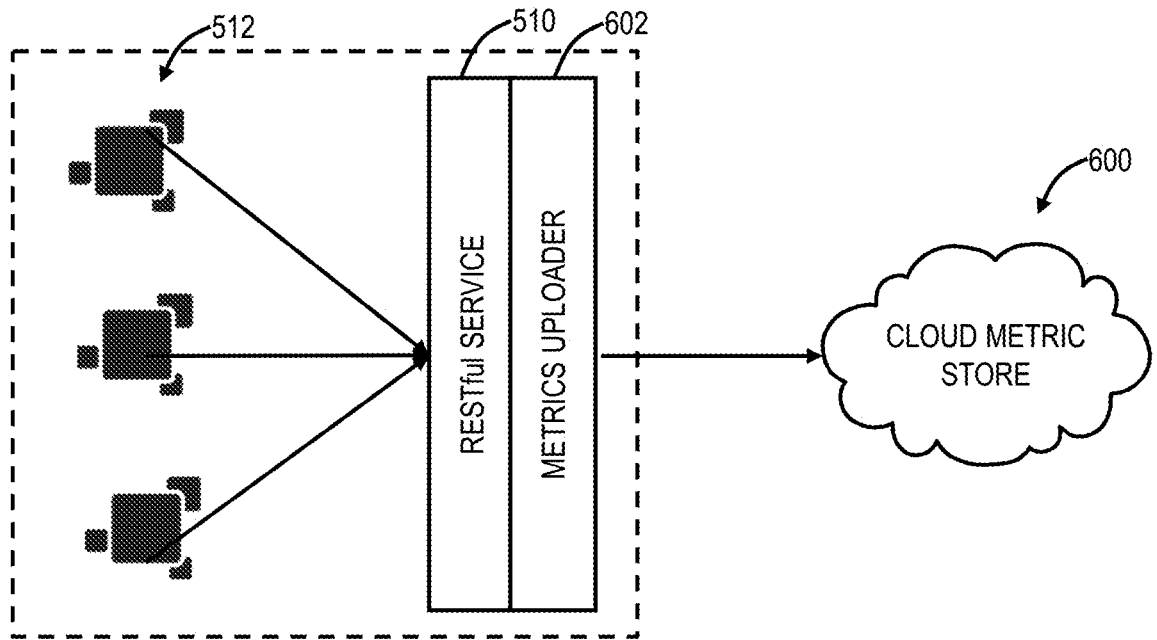
FIG. 12 is a diagram of applications provided metrics to a cloud metric store utilizing the RESTful framework.

FIG. 12 is a diagram of applications 512 provided metrics to a cloud metric store 600 utilizing the RESTful framework 510. For example, assume the cloud-based system 100 is utilized as a security system as described herein, and the cloud-based system 100 is further configured to perform user experience monitoring also as described herein. The RESTful framework 510 is useful to interoperate with the cloud-based system for upload metrics, such as for user experience monitoring. Of course, this can be for any application 512.

The applications 512 can define their own metrics such as for monitoring, debugging, etc., and severity levels can also be attached to metrics. Also, the metrics can be grouped by devices 300 the application 512 interacts with. The RESTful framework 510 automatically sends these metrics periodically to a centralized cloud store 600, such as via a metrics uploader 602. The cloud store 600 can be in the storage cluster 156.

The metrics can be counters that are very useful for the debugging and analysis of an application 512. The RESTful framework 510 provides APIs to send metrics (counters whose value has been changed) periodically to a central hub. In an embodiment, the RESTful framework 510 keeps track of the previous value (the value sent last time) and current value of every counter, metrics can be at some interval, and the RESTful framework 510 attempts to find counters whose values have changed for each severity and device pair. If there is one or more such counters, the RESTful framework 510 will send a metrics JSON for this pair.

¶7.6 CASB AND DLP SUPPORT WITH THE RESTFUL FRAMEWORK

In an example embodiment, the cloud-based system 100 can provide CASB and/or DLP functionality in addition to the other security functions. A challenge in adding CASB and/or DLP functionality to an existing monolith is a challenge, i.e., a primary challenge is communication between many components, and creating a new custom protocol or interface would have added complexity, RESTful was desired but using a standalone server just for API is not practical. The RESTful framework 510 can be embedded in the nodes 150, i.e., it is a module within existing components and is easier to develop and maintain, providing full JSON-based communication interfaces.

¶7.7 RESTFUL FRAMEWORK PROCESS

Figure 13:
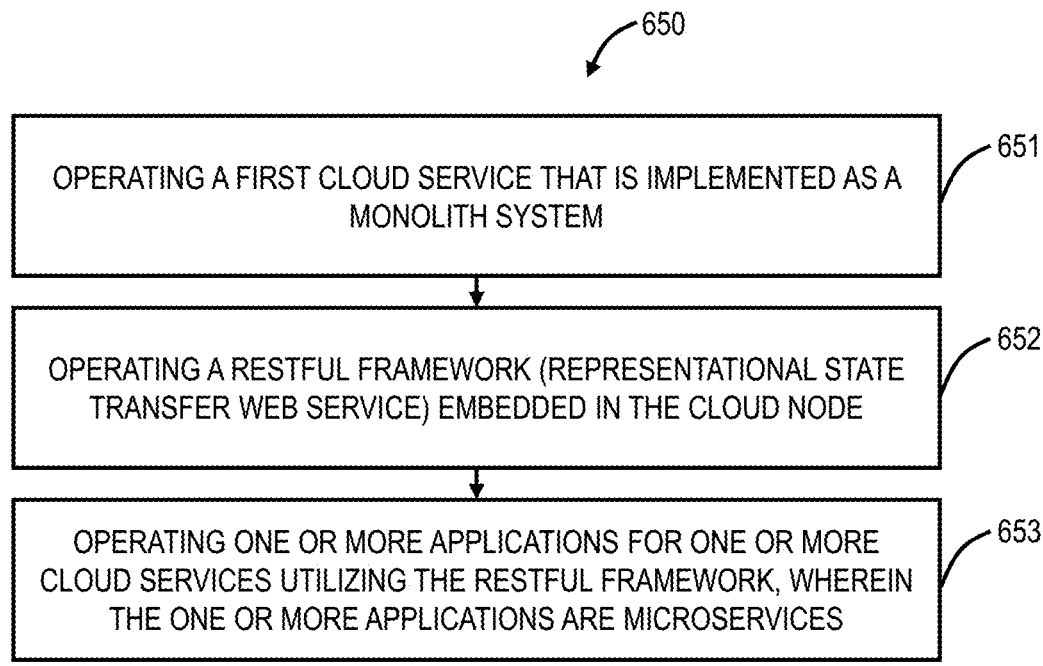
FIG. 13 is a flowchart of a RESTful framework process.

FIG. 13 is a flowchart of a RESTful framework process 650. The process 650 can be implemented in one of the nodes 150, as a method, and as instructions in a non-transitory computer-readable medium. Again, the RESTful framework 510 is a library for creating a RESTful server on the node 150. The RESTful framework 510 leverages the fast HTTP parsing logic that provides large performance gains over traditional web servers.

The process 650 includes operating a first cloud service that is implemented as a monolith system (step 651); operating a RESTful framework (Representational State Transfer web service) embedded in the cloud node (step 652); and operating one or more applications for one or more cloud services utilizing the RESTful framework, wherein the one or more applications are microservices (step 653).

The RESTful framework can utilize Hypertext Transfer Protocol (HTTP) methods. The first cloud service can include inline monitoring for security, and the one or more cloud services can include user experience monitoring. The first cloud service can required less latency than the one or more cloud services. The RESTful framework can be configured for Server Name Indication (SNI) routing with the one or more applications. The operating the one or more applications can be based on a load balancer monitoring the one or more applications. The one or more applications can include metric collection where the RESTful framework is configured to update the metrics based on changes. The RESTful framework can utilize a same network and operating stack as the monolith system.

¶8.0 TELEMETRY AND POLICY GATEWAY (TPG)

Figure 14:
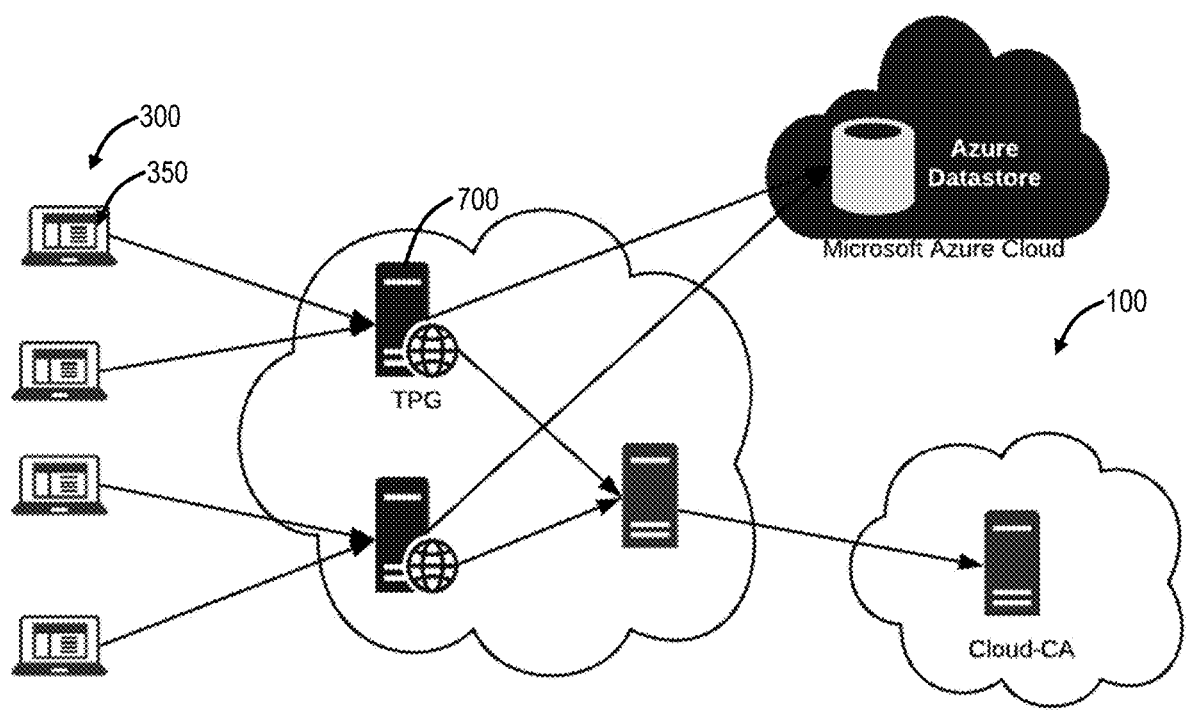
FIG. 14 is a network diagram of a Telemetry and Policy Gateway (TPG).

FIG. 14 is a network diagram of a Telemetry and Policy Gateway (TPG) 700. As described herein, digital experience monitoring can be a service offered via the cloud-based system 100 for monitoring user performance. The TPGs 700 are a primary point of contact for the connector application 350 for the purpose of download policies and pushing collected statistics. The challenge here is to scale both vertically as well as horizontally since there can be millions or more of applications 350 communicating with the TPG 700. The TPG 700 can run as an application in servers 200 utilizing the RESTful framework 510 which simplifies the communication design between the applications 350. Of course, the communication with the application 350 is one example such as for configuration updates and metric publications; other examples are contemplated.

Highlights of the TPG 700 include optimizing the updates of the latest policies/configuration to the devices 300, such as by managing version numbers. This way the connected devices 300 will download policies only when there is a change in a policy for that device 300. Also, there is a reduction of the load on upstream data/config stores by caching policies and customizing the policy on a per device basis. The TPG 700 acts as not just a cache but has the ability to customize the configuration on a per device basis, thus relieving stress on the upstream data/config stores. The TPG 700 has the ability to add Geo location information to the metrics uploaded by the devices 300 based on the data transmitted. The TPG identifies the device location by looking into any of the location identifiable parameters like IP address or Lat/Long and publishes that data into the data store.

The TPG 700 can aggregate data to optimize the upload and the storage of the data into any third-party data store. So when multiple devices upload their data into the TPG, it can aggregate data across multiple devices and push that to any data store helping save compute cycles on expensive data stores. Also, the TPG 700 can be a stateless and horizontally scaling server—as this is a stateless server, it is possible seamlessly add and remove an instance into the cluster. The management of a transaction state is managed by the entities talking to the TPG 700.

The TPG 700 itself is multi-tenant and has a scope of single clouds. The connector applications 350 use RESTful endpoints to push data (metrics) and request for policies.

Figure 15:
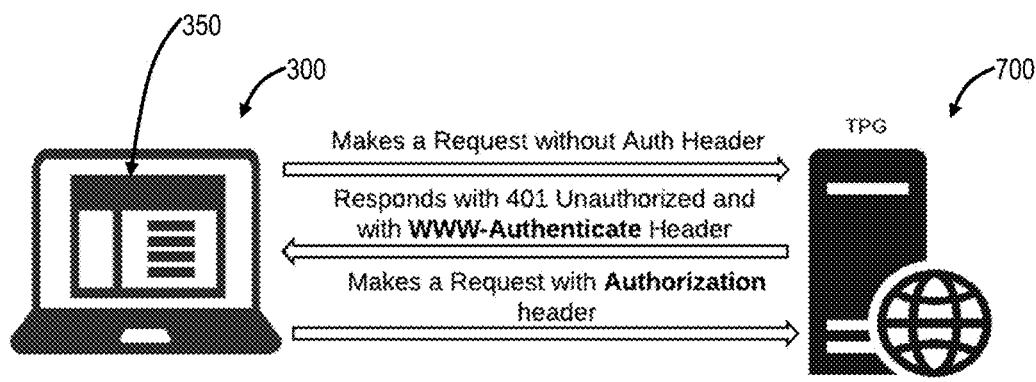
FIG. 15 is a diagram illustrating authentication between a user device and the TPG.

FIG. 15 is a diagram illustrating authentication between a user device 300 and the TPG 700. In an embodiment, the TPG 700 can use digest Authentication to authenticate with a connector application 350. The connector application 350 sends the device credentials (Device ID and password) in the digest authentication HTTP header. The following illustrates an example

| | |
|---|---|
| Application 350 to TPG 700 | GET /tpg/ HTTP/1.1<br>Host: 10.66.106.19<br>User-Agent: curl/7.50.3<br>Accept: */* |
| TPG 700 to application 350 | HTTP/1.1 401 Unauthorized<br>Server: Zscaler<br>Cache-control: no-cache<br>Content-Length: 0<br>WWW-Authenticate: Basic |
| Application 350 to TPG 700 | GET /tpg/policy HTTP/1.1<br>Authorization: Basic<br>ZGlkPTcwMTYxJnVpZD02NzY5NyZjbG91ZD16<br>c2NhbGVydHdvLm5IdDoxODI3NjQ1MjczNDc2MzU5<br>User-Agent: PostmanRuntime/7.16.3<br>Accept: */*<br>Cache-Control: no-cache<br>Postman-Token: 75c06a97-3802-4d6b-8f4c-25d2004f4e82<br>Host: 10.66.106.10<br>Accept-Encoding: gzip, deflate<br>Content-Length: 0<br>Connection: keep-alive |
| TPG 700 to application 350 | HTTP/1.1 200 OK<br>Server: Zscaler<br>Content-Length: 0 |

Figure 16:
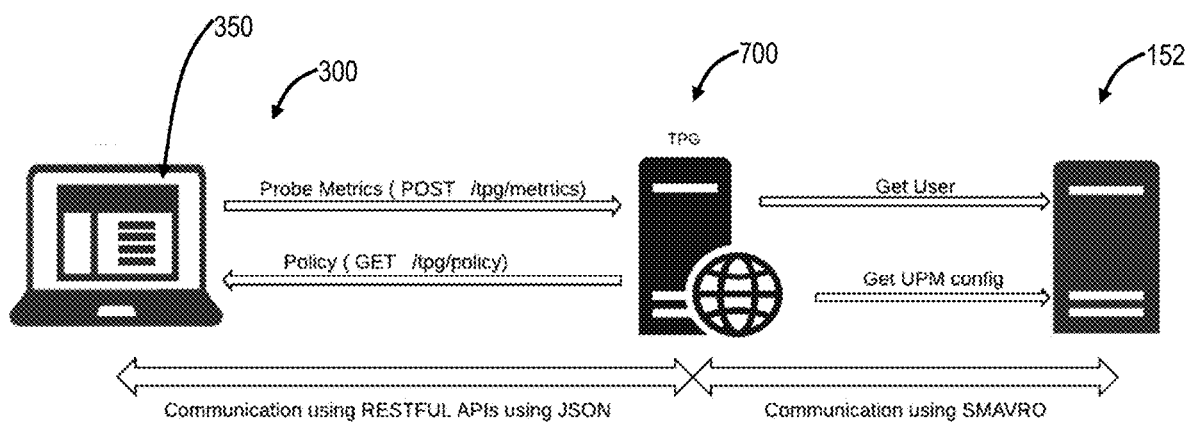
FIG. 16 is a diagram illustrating communication between a user device and the TPG.

FIG. 16 is a diagram illustrating communication between a user device 300 and the TPG 700. The communication between the application 350 and the TPG 700 will be through REST endpoints. The data will be exchanged using JSON format. The TPG 700 can connect to the central authority node 152, such as using a proprietary format.

The TPG 700 can include various RESTful endpoints, and they all require basic authentication. The endpoints can include a GET /policy, a POST /metrics, and a POST /updates. The GET /policy endpoint can provide policy downloads for UPM policy from a central authority node 152. The POST /metrics endpoint can accept metrics payload from the applications 350, populate location info and user info, and then push it to a data store.

¶8.1 TPG REQUEST AND CACHING

The TPG 700 caches objects it fetches from the central authority node 152, such as user configuration (User Performance Management (UPM)) and configuration for each tenant. The following provides an example:
https://<TPG Service IP>/tpg/policy?version=<version number>&locid=<location id>

| Response Code | Comments |
|---|---|
| 200 OK | Policy Download is Successful |
| 204 No Content | If no new policy is available that is newer than the requested version. Only Returned when policy version requested is non-zero. |
| 429 Too Many Requests | This allows us to do Flow control. The server is busy processing requests. ZAPP should try again later after the "Retry-After" seconds sent in the response header. |
| 401 Unauthorized | Authentication is required. Send a valid authentication header. The response contains the realm for the authentication. |
| 403 Forbidden | The credentials didn't match. |
| 400 Bad Requests | Invalid Requests. Make sure the query parameters are correct. |
| 500 Server Error | Error at the server end. Need to raise escalation for such errors. |

A version number can be used to control the versioning of configurations. The version number is used to avoid downloading policies when there are no changes. Clients can extract version number from the downloaded config and send the same version number on the next request. It can always request version 0 if it is requesting the config for the first time.

¶8.2 FLOW FOR POLICY

Figure 17:
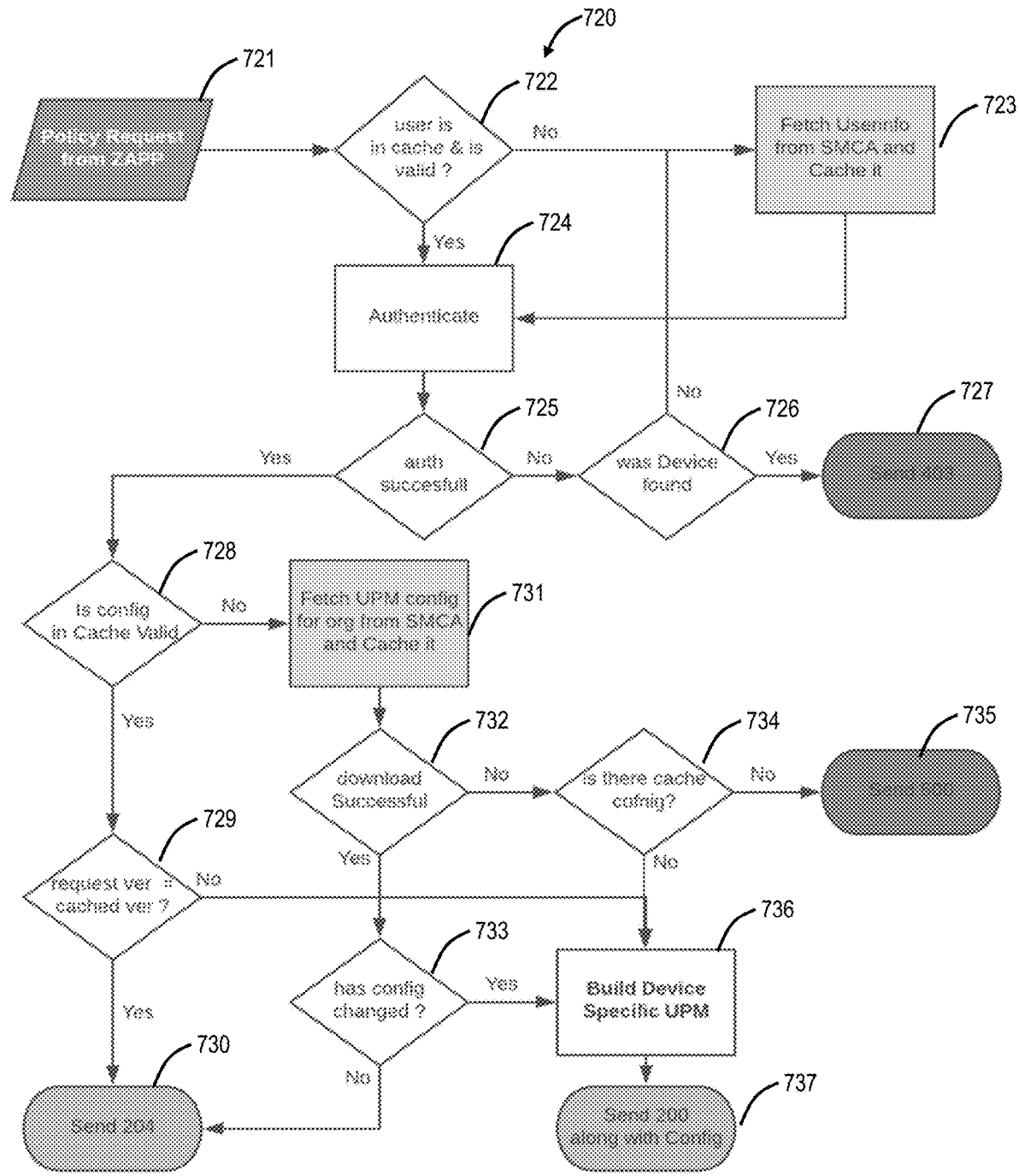
FIG. 17 is a flowchart illustrating a process of policy flow associated with the TPG.

FIG. 17 is a flowchart illustrating a process 720 of policy flow associated with the TPG 700. A policy request is sent from a connector application (721), and the TPG checks if the user is in the cache and is valid (step 722). If not, the TPG can fetch user info from a central authority and cache it (step 723). The TPG then authenticates the user (step 724). If the authentication is not successful (step 725), and if the device was not found (step 726), the process 720 returns to step 723, otherwise if the device was found (step 726), the process 720 concludes and sends a code 403 (step 727).

If the authentication is successful (step 725), the process 720 includes checking if the configuration in the cache is valid (step 728), and, if so, checks if a requested version is the same as the cached version (step 729), and, if so, terminates and sends a code 204 (step 730). If the configuration in the cache is not valid (step 728), the TPG fetches a UPM configuration for the organization from the central authority and caches it (step 731).

If the download is successful (step 732), the process 720 checks if the configuration has changed (step 733), and, if not, the process 720 terminates and sends a code 204 (step 733). If the download is bit successful (step 732), the process 720 checks if there is a configuration in the cache (step 734), and, if not, the process 720 terminates and sends a code 500 (step 735). If there is no configuration in the cache (step 734) or if the configuration has changed (step 733), the process 720 includes building a device specific UPM (step 736), and the process 720 terminates and sends code 200 along with the configuration (step 737).

¶8.3 TPG PROCESS

Figure 18:
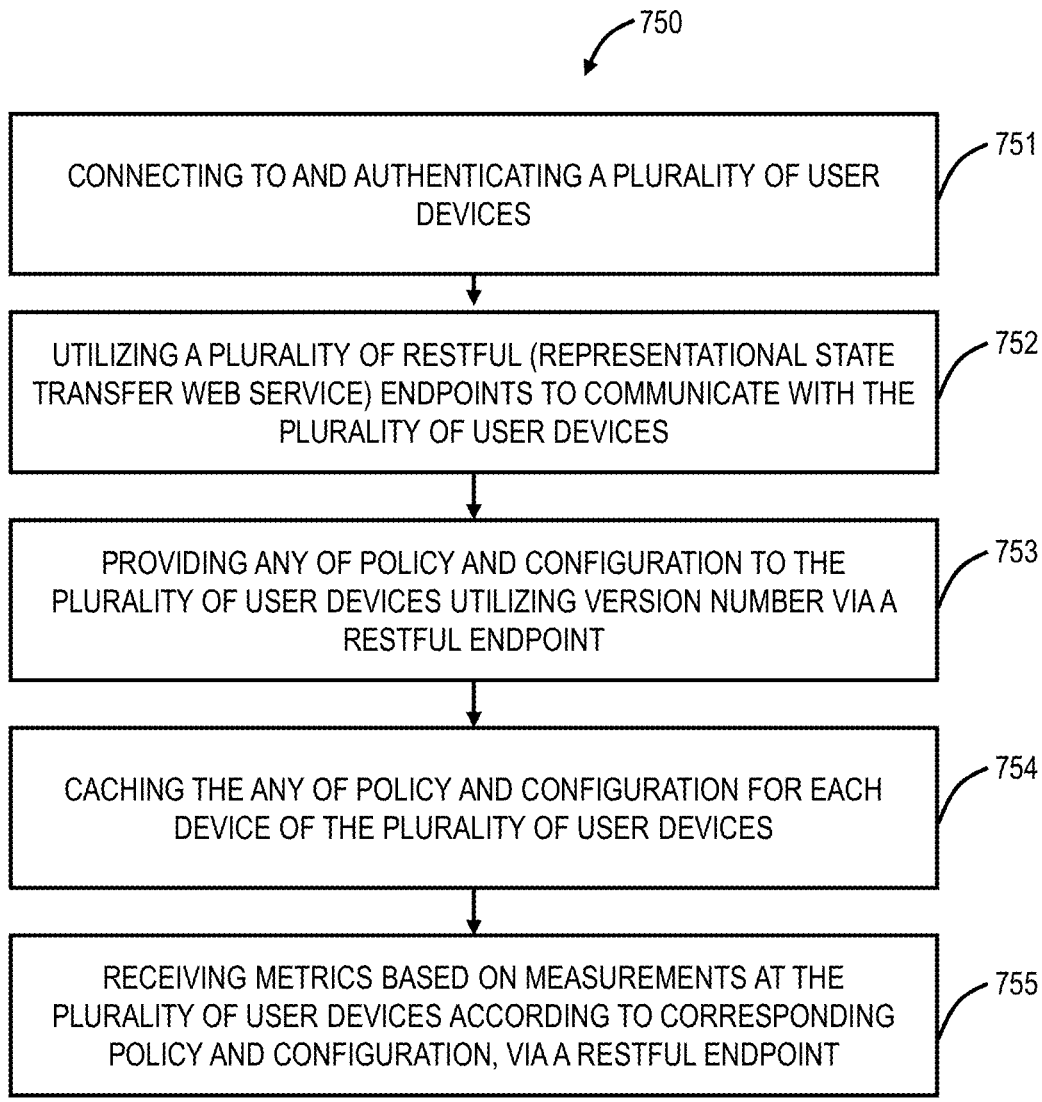
FIG. 18 is a flowchart of a process implemented by a TPG.

FIG. 18 is a flowchart of a process 750 implemented by a TPG 700. The process 750 can be a computer-implemented method, implemented as instructions stored in a computer-readable medium and executed by one or more processors, or by an apparatus such as the enforcement node 150 or the server 200 or the TPG 700.

The process 750 includes connecting to and authenticating a plurality of user devices (step 751); utilizing a plurality of RESTful (Representational State Transfer web service) endpoints to communicate with the plurality of user devices (step 752); providing any of policy and configuration to the plurality of user devices utilizing version number via a RESTful endpoint (step 753); caching the any of policy and configuration for each device of the plurality of user devices (step 754); and receiving metrics based on measurements at the plurality of user devices according to corresponding policy and configuration, via a RESTful endpoint (step 755).

The process 750 can further include obtaining the any of policy and configuration from a central authority associated with the cloud-based system. The process 750 can further include publishing the received metrics to a cloud metric store associated with the cloud-based system. The process 750 can further include aggregating received metrics from some or all of the plurality of devices; and publishing the aggregated received metrics to a data store. The process 750 can further include adding geo location information to the received metrics based on location identifiable parameters. The cloud-based system can include the TPG node and one or more additional TPG nodes, each TPG node is stateless with respect to one another. The received metrics can be associated with user experience monitoring.

¶9.0 DEVICE ELECTION FOR RANDOM POPULATION SELECTION OF REMOTE DEVICES

The user experience monitoring can utilize probe traffic for measuring performance. The probe traffic can go direct to destinations or through the cloud-based system 100. For example, the use of such probes is described in commonly-assigned U.S. patent application Ser. No. 17/188,007, filed Mar. 1, 2021, and entitled "Proactively detecting failure points in a network," and in U.S. patent application Ser. No. 17/235,267, filed Apr. 20, 2021, and entitled "Cached web probes for monitoring user experience," the contents of each are incorporated by reference in their entirety. When probes are sent through the cloud-based system 100, the nodes 150 can cache probes and optimize the actual number of probes sent to the destination. Since the cloud-based system 100 acts as the man in the middle, it is possible to throttle the number of outbound probes. Without the throttling, the probes can flood a given destination causing the destination to blacklist sites, such as the cloud-based system 100.

Similar problems exist even when the user device 300 does not go through the cloud-based system 100. In such cases, there is a need to have the connector applications 350 throttle the number of probes to avoid flooding a given destination. Here are some example scenarios where probes may go direct to destinations instead of through the cloud-based system 100. A user experience monitoring customer does not use the cloud-based system 100 for inline monitoring or the customer uses the cloud-based system 100 but has configured bypass for certain traffic.

A tenant (organization) can have thousands of users 102, and the cloud-based system 100 can have millions of users 102 for the user experience monitoring. The cloud-based system 100 can cache probes to reduce the load. Further, the present disclosure includes an election protocol where a subset of devices 300 are used. This reduces the footprint of devices 300 designated for a task, reduces CPU and memory on end devices 300 as they do not have to always perform the designated tasks, and the like.

This further ensures fairness in the selection of devices 300 considering various parameters such location, organization, device-type, department, group etc., so that the burden of performing the tasks is evenly distributed. As fairness is ensured, this gets a diverse set of devices 300 giving good data to base decisions on. This further protects the IP address reputation of devices 300 as they do not send as many probes.

The user experience monitoring provides network monitoring and debugging with deep tracing. The devices 300 send web probes (HTTP requests) as well as network probes (Traceroute, Ping etc). When lots of devices 300 from the same location (i.e., same office location) start sending these probes, it can overwhelm the network bandwidth and potentially interfere with regular browsing. There is a need to limit the number of devices 300 which can send these probes without losing network tracing data. The TPG 700 is responsible for serving policies to devices 300, and it is possible to implement an election algorithm where TPG 700 can decide which devices 300 should be sending the probes from a given location

¶9.1 ELECTION MECHANISM

Figure 19:
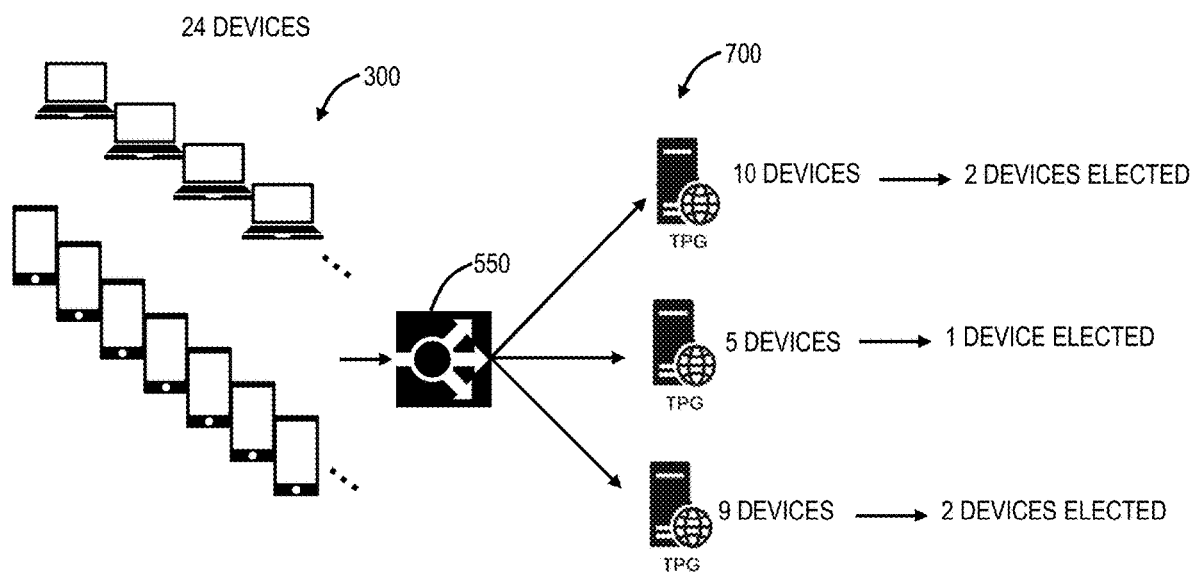
FIG. 19 is a network diagram of an example election of user devices for performing measurements.

FIG. 19 is a network diagram of an example election of user devices 300 for performing measurements. This example includes 24 user devices 300, connected to a load balancer 550 and three TPGs 700. Each TPG 700 can do an election independently as the TPGs 700 are stateless, so there is no shared state among TPGs. The TPGs 700 can be connected to 10, 5, and 9 devices respectively, and elect 2, 1, and 2 devices, respectively.

The election can include each monitor (TPG 700) defining a selection percentage. This value defines what is the percentage of devices from a given IP, that should run this monitor in direct mode.

The election is done at the monitor level. For each unique source IP the TPG 700 sees, it would carry out election based on the source IP/subnet and monitor ID combination.

The TPG 700 maintains a state for each monitor ID, source IP/subnet combination and uses to carry out the election.

The election can be valid for time period Tm. This time period Tm should be larger than the frequency of probes that will be carried out. For example, if probes are sent every 5 minutes, then Tm should be greater than 5.

The TPGs 700 can adhere to the same value of Tm and the start of the Time period can be aligned on all the TPGs 700. This can be achieved by using GMT epoch time on each TPG to find the start of Tm boundary.

The election is random which provides a good deal of fairness.

The process does not guarantee that exact level of desired selection percentage will be achieved. The algorithm does its best effort to achieve the desired configured selection percentage.

The election information is sent as part of the config download to the application 350. The election is sent as a separate object in the config.

The following code describes a probability calculation

Figure 20:
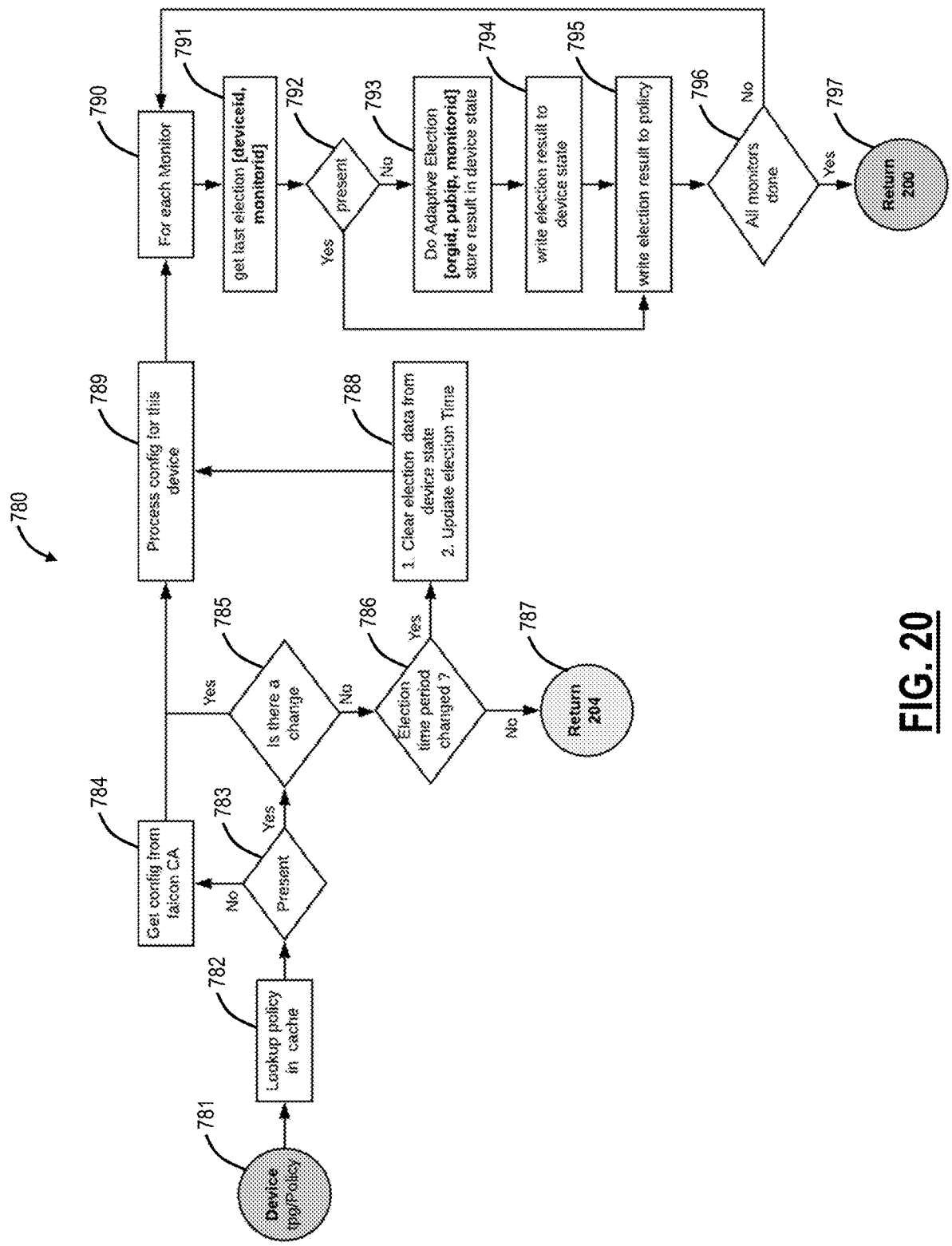
FIG. 20 is a flowchart of an TPG election process.

Election State {
Current_time_period;
Total_devices_seen;
Total_devices_selected;
Current_selection_percentage;
}
Do_adaptive_election (desired percentage, source_ip, monitor_id)
   state=get_election_state(source_ip, monitor_id)
   If expired (state→current_time_period)
     Total_devices_seen=0
     Total_devices_selected=0
     Current_selection_percentage=0
   Selected=true
   If state→total_devices_seen
     Adaptive_probability=pow(desired_percentage/state→current_selection_percentage, 4)*
     Desired_percentage
     If random( ) % 100>adaptive_proability
       Selected=false
   Return selected FIG. 20 is a flowchart of an TPG election process 780. A device 300 connects to a TPG 700 (step 781) which looks up policy in its cache (step 782). If the policy is not present (step 783), the TPG 700 gets the configuration from a central authority (step 784). If the policy is present (step 783), the process 780 checks if there is a change (step 785), and, if not, and if the election time period has not changed (step 786), the process 780 terminates and returns a code 204 (step 787). If the election time period has changes (step 786), the process 780 clears the election data from the device state and updates the election time (step 788).

After the steps 784 and 788 and if there is a change in the policy (step 785), the process 780 processes the configuration for the device (step 789). For each monitor (TPG 700) (step 790), the process 780 gets the last election (step 791) and checks if the device was present (step 792), and, if not, the process 780 performs an adaptive election and stores the result (step 793). The process then writes the election results (step 794). If the device was present (step 792) and after step 794, the loop checks if all monitors are done (step 796), and terminates, if so, returning code 200 (step 797).

¶9.2 ELECTION PROCESS

Figure 21:
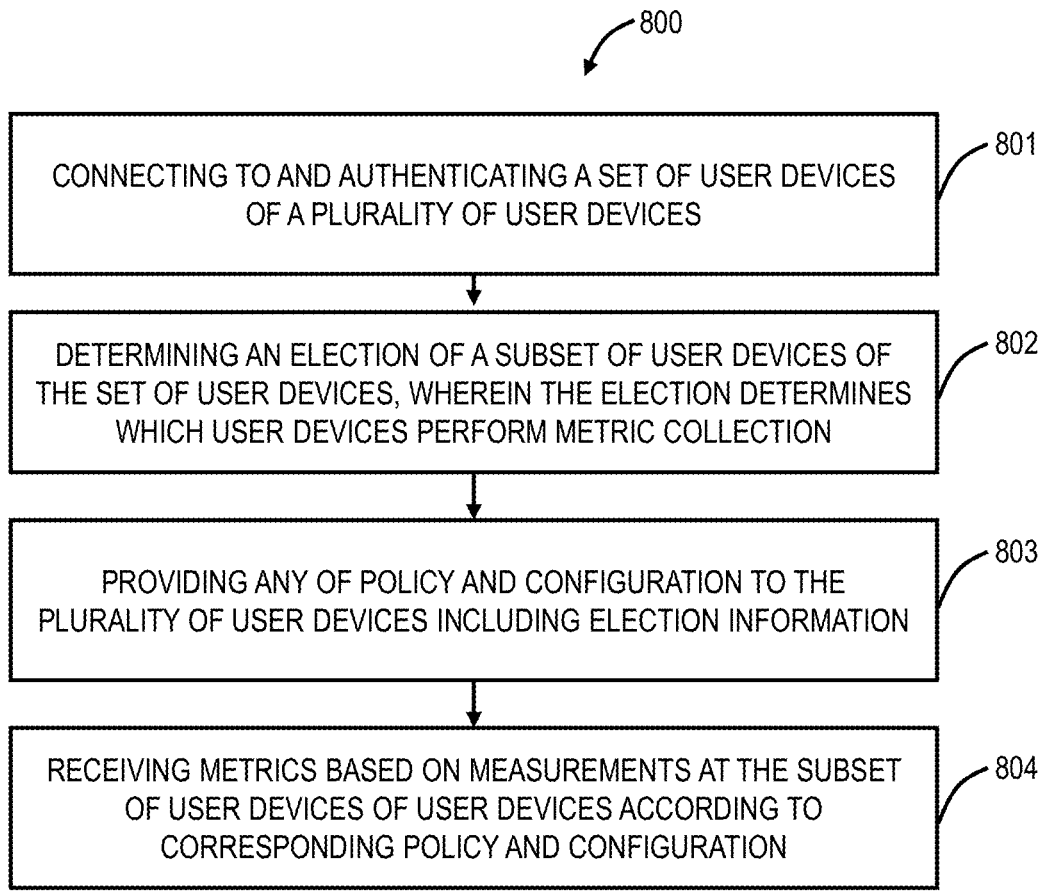
FIG. 21 is a flowchart of a process for electing devices.

FIG. 21 is a flowchart of a process 800 for electing devices. The process 800 can be a computer-implemented method, implemented as instructions stored in a computer-readable medium and executed by one or more processors, or by an apparatus such as the enforcement node 150 or the server 200 or the TPG 700.

The process 800 includes connecting to and authenticating a set of user devices of a plurality of user devices (step 801); determining an election of a subset of user devices of the set of user devices, wherein the election determines which user devices perform metric collection (step 802); providing any of policy and configuration to the plurality of user devices including election information (step 803); and receiving metrics based on measurements at the subset of user devices of user devices according to corresponding policy and configuration (step 804).

The election can be for a first time period, and the process 800 can further include performing a second election for a second time period. The first time period and the second time period are larger than a frequency of the measurements.

The election can be based on a combination of source Internet Protocol (IP) address and monitor identifier of each device. The election can be based on a combination of location, organization, device-type, department, and group. The election can be based on a desired percentage of user devices. The cloud-based system can include the node and one or more additional nodes, each node is stateless with respect to one another and performs its election independently, and each node is time synchronized with one another.

¶9.3 ELECTION ALGORITHM FROM A GIVEN LOCATION

Various points to consider include:
There can be multiple egress from a given location.
There can be multiple paths in the local network.
The user experience monitoring wants to gather data about all nodes and paths in local networks. Different devices can be connected to different access points and can be following different paths in the local network before going beyond egress.
The goal is to reduce chatter (i.e., probes) but not to the point that visibility inside the network is lost.
The goal is to have a sufficiently continuous stream of data from a device to help analytics.
Sparse vs. Dense: Depending on the office occupancy and the people in a department, the user experience monitoring can have dense to sparse device concentration at access points.

Figure 22:
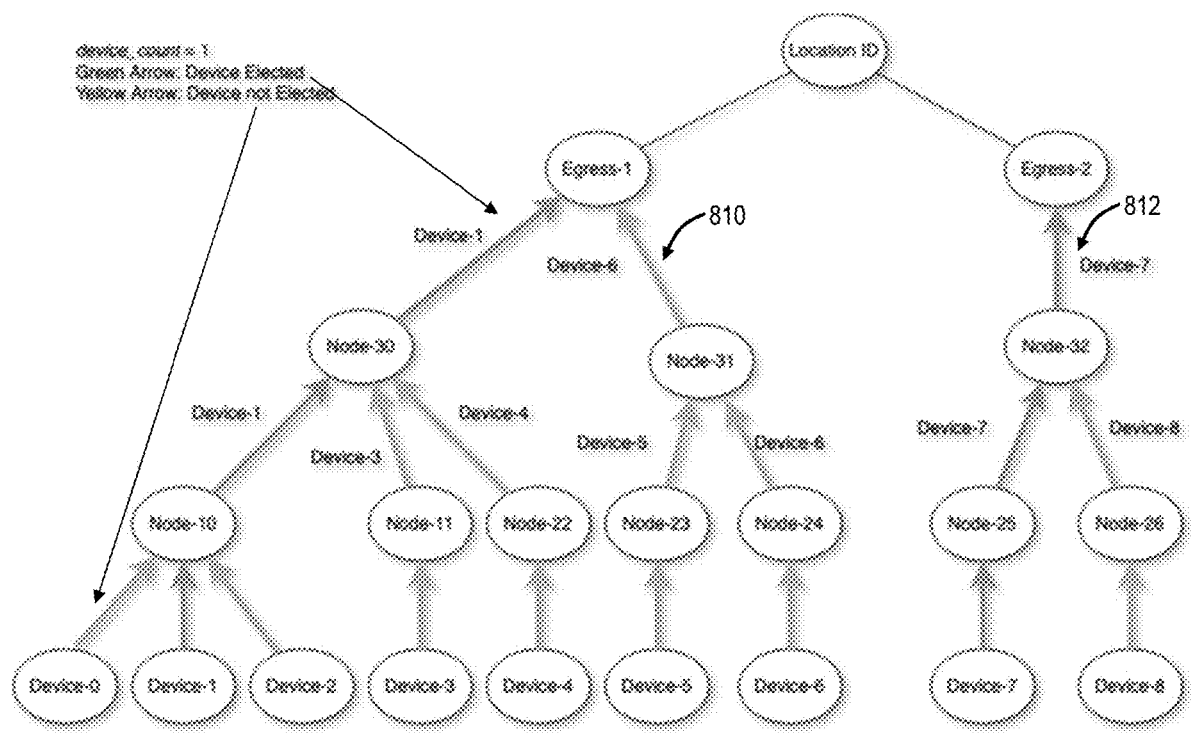
FIG. 22 is a logical view of devices in a given local network.

FIG. 22 is a logical view of devices 300 in a given local network. Imagine the local network as a tree. Leaf nodes are access points where devices 300 connect. Parents to leaf nodes will be next nodes in the network trace and so on.

Assume we want to limit probes to device_count. The TPG 700 will elect device_count number of devices 300 for each leaf node. Out of those devices 300 a total of device_count will be selected for the next level and so on.

Every device 300 will receive a hop_count up to which it is supposed to send a network probe. A device_count number of devices will receive the beyond_egress flag. Devices which are not getting beyond_egress, will not send probe beyond the egress IP if the hop count they received is larger than expected, if such a case arises.

In FIG. 22, probes 810 are terminating inside the network and every network connection is being traced by at least one device 300. Probes 812 are reaching egress and going out to its destination. This will avoid congestion inside the network, save bandwidth and will not overwhelm the destination with unnecessary probes.

When the device 300 starts or if there is a network change event: Call/get_loc to figure out egress, send a tracepath probe with increasing hop count, and stop once reached egress node. Then, send this network path to the TPG 700. The TPG 700 will insert or modify the network topology tree with this information.

The TPG runs election logic (Using Adaptive Probability): From leaves to parent:

If a leaf node, select at most device_count devices for it, else, select at most device_count from last level selection. Make sure to select at least one device from each tree branch. For a selected device, set hop_count equal to current tree level height and the TPG 700 responds to the device with response/policy json.

Full Local Branch: We can select devices in such a way that all the branches of the local network are probed. Set hop_count for each device in such a way that every connection in the network is being traced. This is to make sure that we can detect if communication between any two nodes has a problem.

Probe Frequency: Devices with higher hop_count would send more aggressive keep-alives than devices with lower hop_count. i.e. devices which are running trace to nodes closer to the leaves will run trace less frequently.

Local Network Diagram: We can display local network topology diagrams in a UI using this data. This will give a holistic view of the local network to network administrators.

Having a consistent sample set: For us to get a good sample set, we need to be resilient to devices going down so that the data samples are at a certain level. We might want to engage more devices than needed (N+1 logic).

HTTP long poll: We have a persistent connection between the application 350 and the TPG 700. The application 350 can make a request for the policy and the TPG 700 will hold the request for X seconds. TPG will respond only at the end of X seconds or if anything has changed in that interval. We need to make sure that if the request is going through the node 150, then node 150 must not timeout such requests. This logic can be added to node 150 to give these connections more time.

Detecting a device is down: In order for us to have a good sample set we need to detect a device is down within a guaranteed time. The application 350 can gave two connections—one for policy and one for metrics. We can use TCP keep-alive and have the node 150 inform us of any loss in connectivity.

¶10.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements described herein can be used in any and all combinations with each other.

What is claimed is:

1. A method implemented in a node in a cloud-based system, the method comprising:
 connecting to and authenticating a set of user devices of a plurality of user devices;

determining an election of a subset of user devices of the set of user devices, wherein the election determines which user devices perform metric collection;

in a same local network, selecting the subset of user devices such that each path inside the same local network is measured, wherein the subset of user devices selected in the local network includes a first set that measures inside the local network only and a second set less than the first set that measures inside the local network and outside the local network;

providing policy and configuration to the plurality of user devices including election information; and receiving metrics based on measurements at the subset of user devices of user devices according to corresponding policy and configuration.

2. The method of claim 1, wherein the election is for a first time period, and the method further comprising performing a second election for a second time period.

3. The method of claim 2, wherein the first time period and the second time period are larger than a frequency of the measurements.

4. The method of claim 1, wherein the election is based on a combination of source Internet Protocol (IP) address and monitor identifier of each device.

5. The method of claim 1, wherein the election is based on a combination of location, organization, device-type, department, and group.

6. The method of claim 1, wherein the election is based on a desired percentage of user devices.

7. The method of claim 1, wherein the cloud-based system includes the node and one or more additional nodes, each node is stateless with respect to one another and performs a respective election independently, and each node is time synchronized with one another.

8. A Telemetry and Policy Gateway (TPG) node in a cloud-based system, the TPG node comprising:

one or more processors and memory storing instructions that, when executed, cause the one or more processors to connect to and authenticating a set of user devices of a plurality of user devices;

determine an election of a subset of user devices of the set of user devices, wherein the election determines which user devices perform metric collection;

in a same local network, select the subset of user devices such that each path inside the same local network is measured, wherein the subset of user devices selected in the local network includes a first set that measures inside the local network only and a second set less than the first set that measures inside the local network and outside the local network;

provide policy and configuration to the plurality of user devices including election information; and receive metrics based on measurements at the subset of user devices of user devices according to corresponding policy and configuration.

9. The TPG node of claim 8, wherein the instructions that, when executed, cause the one or more processors to perform a second election for a second time period.

10. The TPG node of claim 8, wherein the election is based on a combination of source Internet Protocol (IP) address and monitor identifier of each device.

11. The TPG node of claim 8, wherein the election is based on a combination of location, organization, device-type, department, and group.

12. The TPG node of claim 8, wherein the election is based on a desired percentage of user devices.

13. A non-transitory computer-readable storage medium having computer-readable code stored thereon for programming a node to perform steps of:

connecting to and authenticating a set of user devices of a plurality of user devices;

determining an election of a subset of user devices of the set of user devices, wherein the election determines which user devices perform metric collection;

in a same local network, selecting the subset of user devices such that each path inside the same local network is measured, wherein the subset of user devices selected in the local network includes a first set that measures inside the local network only and a second set less than the first set that measures inside the local network and outside the local network;

providing policy and configuration to the plurality of user devices including election information; and receiving metrics based on measurements at the subset of user devices of user devices according to corresponding policy and configuration.

14. The non-transitory computer-readable storage medium of claim 13, wherein the election is for a first time period, and the steps further include performing a second election for a second time period.

15. The non-transitory computer-readable storage medium of claim 13, wherein the election is based on a combination of source Internet Protocol (IP) address and monitor identifier of each device.

16. The non-transitory computer-readable storage medium of claim 13, wherein the election is based on a combination of location, organization, device-type, department, and group.

* * * * *